(12) United States Patent
Kuny (10) Patent No.: US 8,147,225 B2
(45) Date of Patent: Apr. 3, 2012

(54) PUMP VALVE HAVING A LIMITING ELEMENT

(75) Inventor: Markus Ernst Kuny, Schopfheimerstrasse (DE)

(73) Assignee: Gardner Denver Schopfheim GmbH, Schopfheim (DE)

( * ) Notice: Subject to any disclaimer, the term of this patent is extended or adjusted under 35 U.S.C. 154(b) by 353 days.

(21) Appl. No.: 12/484,681

(22) Filed: Jun. 15, 2009

(65) Prior Publication Data

US 2009/0324437 A1 Dec. 31, 2009

(30) Foreign Application Priority Data

Jun. 25, 2008 (DE) .................... 10 2008 029 822

(51) Int. Cl.
*F04B 53/10* (2006.01)
*F16K 15/06* (2006.01)
(52) U.S. Cl. .... 417/559; 137/542; 137/543; 137/543.13
(58) Field of Classification Search .................. 417/559; 137/542, 543, 543.13, 543.15
See application file for complete search history.

(56) References Cited

U.S. PATENT DOCUMENTS

| | | | | |
|---|---|---|---|---|
| 3,129,718 A | * | 4/1964 | Schlensker | 137/327 |
| 3,957,114 A | * | 5/1976 | Streich | 166/285 |
| 4,009,756 A | * | 3/1977 | Zehren | 166/250.15 |
| 4,185,656 A | * | 1/1980 | Braukmann | 137/512.3 |
| 4,622,993 A | * | 11/1986 | Taylor | 137/542 |
| 6,340,031 B1 | * | 1/2002 | Matsumoto et al. | 137/513.3 |
| 2003/0235508 A1 | | 12/2003 | Vicars | |
| 2006/0175092 A1 | * | 8/2006 | Mashburn | 175/57 |

FOREIGN PATENT DOCUMENTS

| | | |
|---|---|---|
| DE | 197 41 249 A1 | 3/1999 |
| DE | 101 16 089 A1 | 10/2002 |
| GB | 2 284 449 | 6/1995 |
| KR | 2001 0063399 | 7/2001 |
| WO | WO 2006/096179 | 9/2006 |

OTHER PUBLICATIONS

English translation of abstract of DE 197 41 249 A 1.
English translation of abstract of DE 101 16 089 A 1.
Office Action issued in the parent German case, DE 10 2008 029 822.0.

(Continued)

*Primary Examiner* — Charles Freay
(74) *Attorney, Agent, or Firm* — James B. Conte; Husch Blackwell LLP (57) ABSTRACT

The invention concerns a pump having a housing; a working chamber located in the housing for delivery of a fluid; a suction channel which is in flow connection with the working chamber for guiding the fluid into the working chamber; a valve unit disposed in the suction channel, the valve unit has a guide body, a limiting element which is guided for displacement in the guide body and has at least one displacement stop for limitation of displacement, a valve which is movable between an open position and a sealing position for controlling the flow of the fluid into the suction channel, wherein the valve is guided for displacement, and a pressure element which presses the limiting element in the direction of the sealing position of the valve; as well as a pressure channel which is in flow connection with the working chamber for guiding the fluid out of the working chamber.

13 Claims, 5 Drawing Sheets

OTHER PUBLICATIONS

English translation of Abstract regarding previously disclosed KR 2001-0063399, Jul. 2001.
Summary of KR2001-0063399, previously cited, Jul. 2001.
EP Search Report for application PCT/EP2009/003979 dated Aug. 6, 2009 (4 pages) for companion PCT case.
Written Opinion of the International Search Authority for International Application No. PCT/EP2009/003979 (5 pages) for companion PCT case, Apr. 2005.

* cited by examiner

PUMP VALVE HAVING A LIMITING ELEMENT

BACKGROUND OF THE INVENTION

1. Field of the Invention

The invention concerns a pump and a valve unit for a pump. The invention in particular concerns a vacuum pump or a compressor, respectively, and a non-return valve unit for a vacuum pump or a compressor, respectively, of this type.

2. Background Art

As it is known, pumps of this type may be used for delivery of fluids. In this disclosure, the term fluid refers to a medium such as a liquid, a gas or a liquid-gas mixture. Non-return valves are conventionally arranged on the suction side of pumps in order to prevent a backflow of fluid after switching off the pump. The arrangement of the non-return valves in a vacuum pump poses the problem that there is merely an extremely low pressure on the suction side of the pump. While the non-return valves should on the one hand provide reliable sealing, they should on the other hand have no pressure loss at all or only to a very low extent. Even minute amounts of pressure loss already reduce the attainable ultimate vacuum of the vacuum pump.

Vacuum pumps are often equipped with spring-loaded non-return valves. The springs used therein should have a low spring stiffness for the non-return valves to open easily in the event of a particular flow while causing only a minor amount of pressure loss. After switching off the pump, the spring should press the valve disk against the valve seat in a light but sealing manner. Process-safe fabrication of springs having these properties is however very difficult.

SUMMARY OF THE INVENTION

It is the object of the invention to develop a pump in a way that the valve unit thereof is particularly reliable to use and is fabricable in a process-safe manner. Another object of the invention is to create a corresponding valve unit for a pump.

These objects are achieved according to the invention by a pump comprising a housing, a working chamber located in the housing for delivery of a fluid, a suction channel which is in flow connection with the working chamber for guiding the fluid into the working chamber, a valve unit disposed in the suction channel, the valve unit comprising a guide body, a limiting element which is guided for displacement in the guide body and comprises at least one displacement stop for limitation of displacement, a valve which is movable between an open position and a sealing position for controlling the flow of the fluid in the suction channel, the valve being guided for displacement, and a pressure element which presses the limiting element in a direction towards the sealing position of the valve, and a pressure channel which is in flow connection with the working chamber for guiding the fluid out of the working chamber.

Furthermore, these objects are achieved according to the invention by a valve unit for a pump, the valve unit comprising a guide body, a limiting element which is guided for displacement in the guide body and comprises at least one displacement stop for limitation of displacement, a valve which is movable between an open position and a sealing position for controlling the flow of the fluid in the suction channel, the valve (23) being guided for displacement, and a pressure element which presses the limiting element in the direction of the sealing position of the valve.

The essence of the invention is to provide a valve unit with a guide body which guides a limiting element for displacement thereof. The limiting element has at least one displacement stop. Furthermore, a valve is advantageously guided for displacement through the guide body.

An advantageous embodiment of the invention will hereinafter be described with reference to the enclosed drawing.

DESCRIPTION OF THE PREFERRED EMBODIMENT

Figure 1:
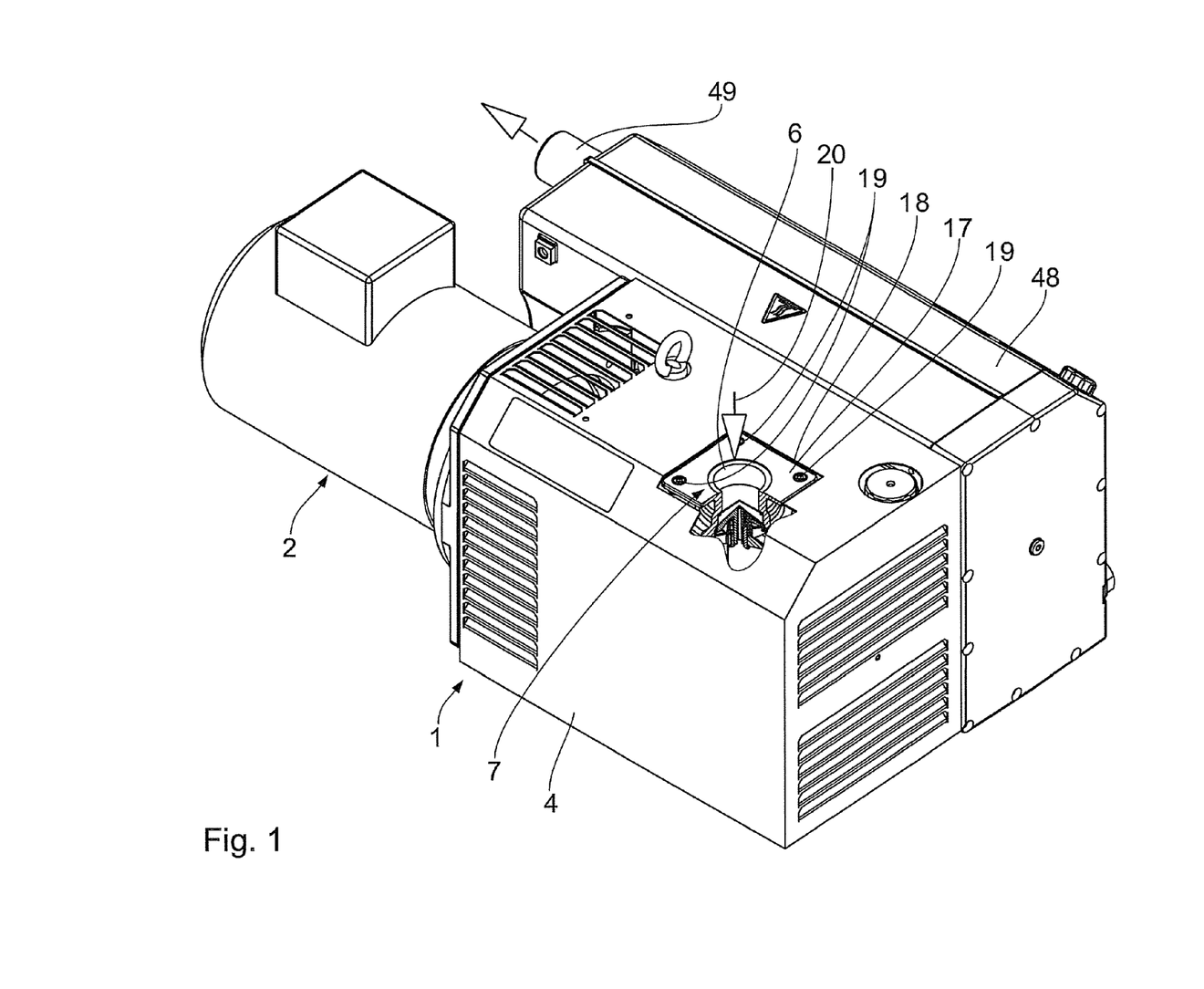
FIG. 1 shows a perspective view of the inventive pump, wherein the valve unit thereof is shown in a partly cut-away view on the suction side.
Figure 2:
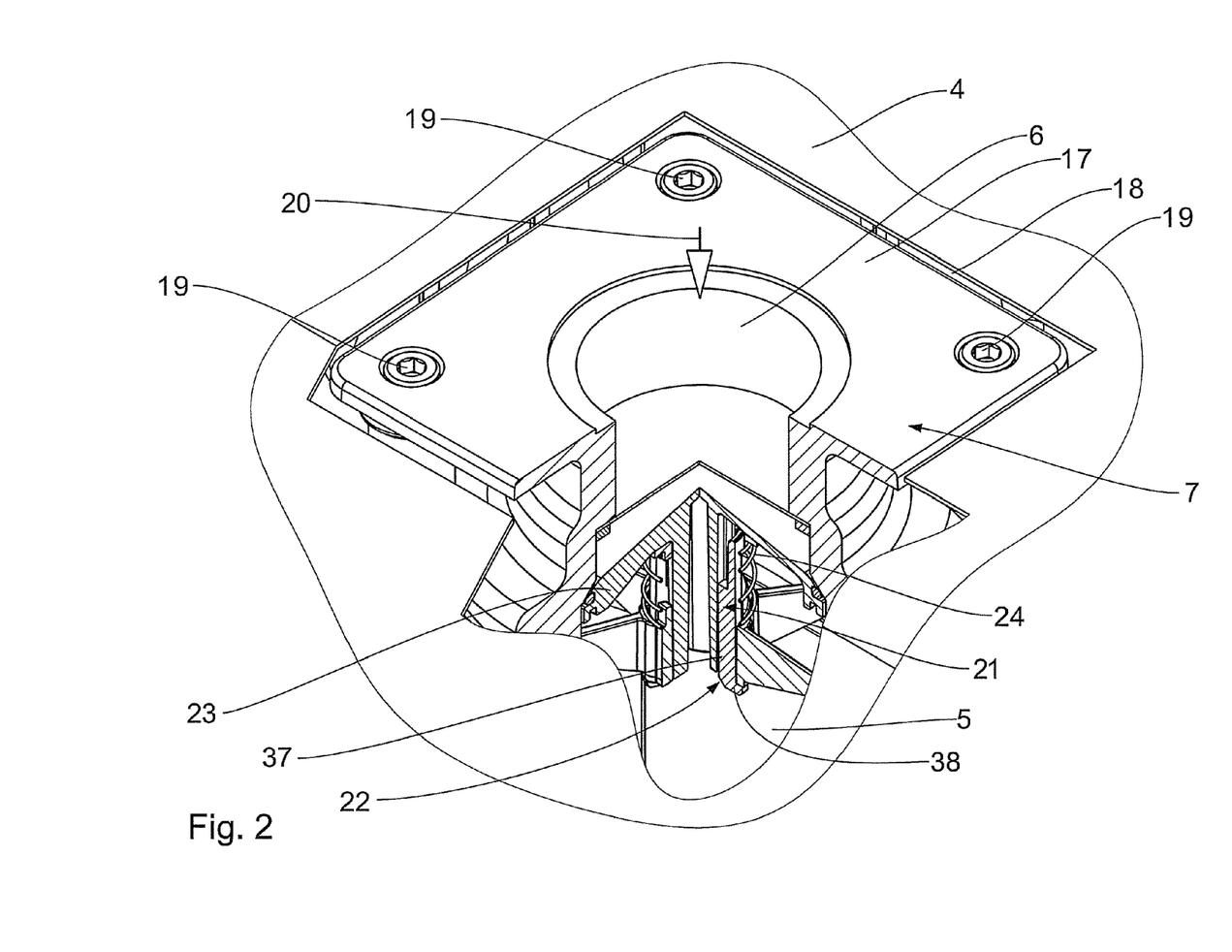
FIG. 2 shows an enlarged view of the valve unit shown in a partly cut-away view in FIG. 1.
Figure 3:
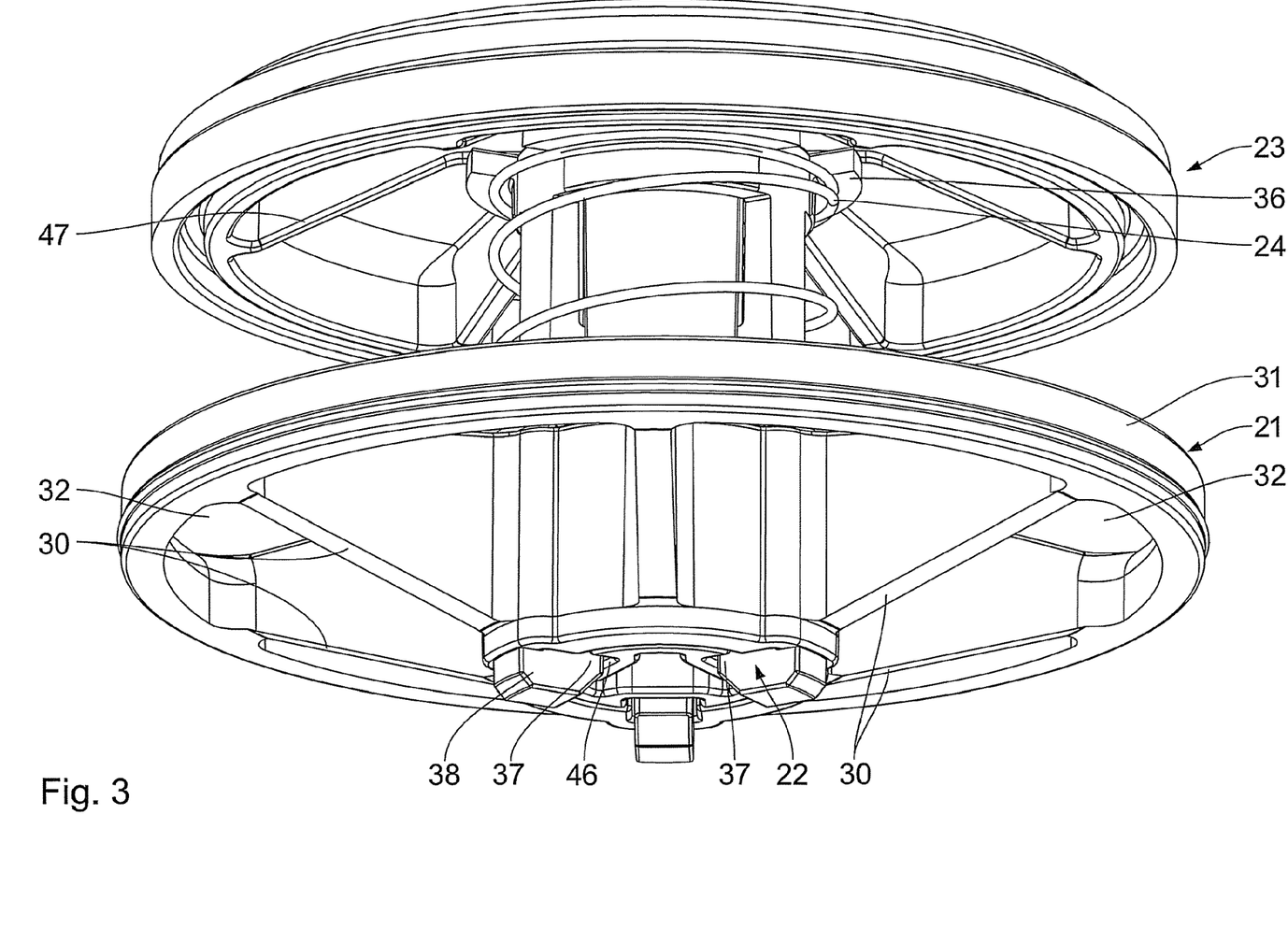
FIG. 3 shows a perspective view of the inventive valve unit.
Figure 4:
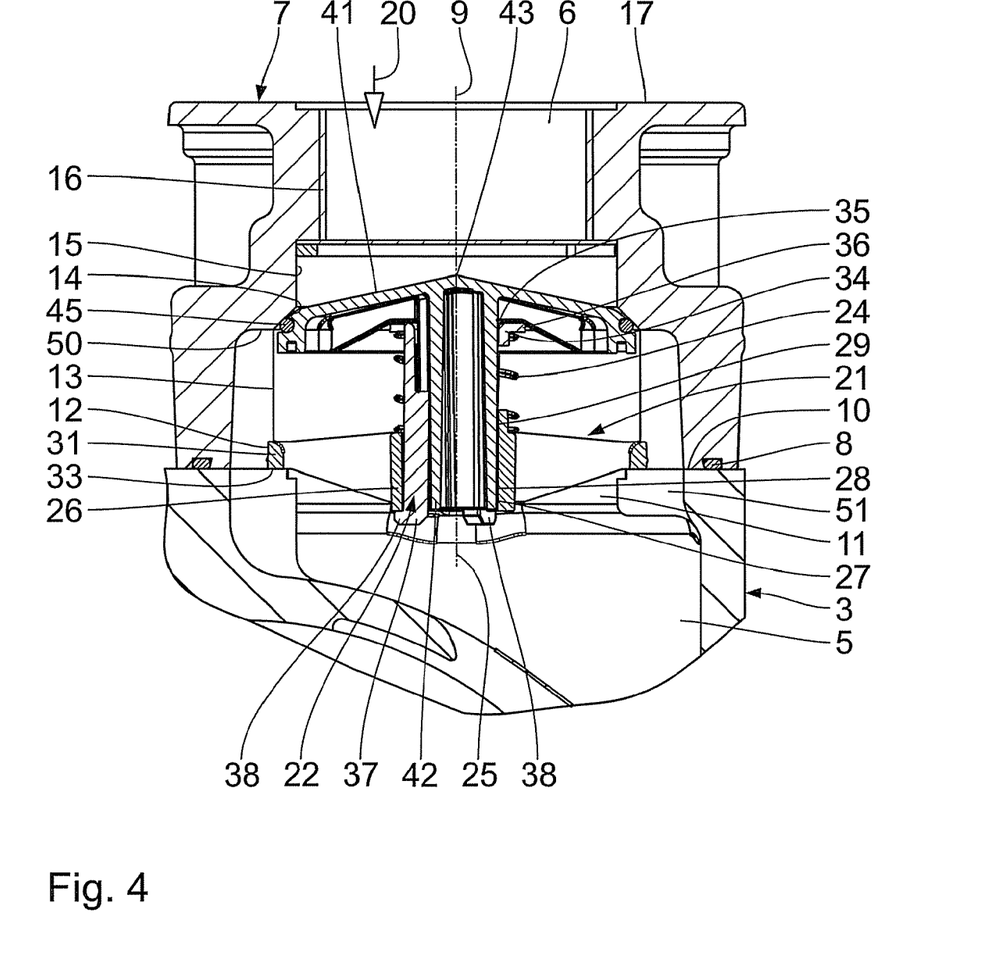
FIG. 4 shows a sectional view of the valve unit in an installed position, wherein the valve thereof is in a sealing position.

As can be seen in FIG. 1, a drive motor 2 for operation of a pump 1 is flange-connected to the pump 1. The drive motor 2 is a conventional electric rotary drive.

In this embodiment, the pump 1 is a vacuum pump which is able to generate a vacuum. The vacuum pump 1 is designed as a rotary compressor vacuum pump. More specifically, the vacuum pump 1 is an oil-flooded rotary-vane vacuum pump. The invention may however also be implemented using other pumps.

As can be seen in FIGS. 1 to 5, the pump 1 has a housing 3 which is cast from a casting material and is surrounded by a cover 4 with air slots. In the housing 3 is disposed a substantially closed working chamber 5 in which a rotor is mounted for rotation. The rotor is drivable for rotation about its horizontal central longitudinal axis by way of the horizontal drive shaft of the drive motor 2. The rotor has rotary-vane guides in which rotary vanes are guided for displacement. The working chamber 5 is only partly shown in the drawings.

A suction channel 6 through which a fluid to be delivered or compressed, respectively, is able to enter the working chamber 5 is in flow connection with the working chamber 5. The suction channel 6 has a substantially circular flow cross-section and is radially outwardly delimited by a connector 7. Regarded as a component of the housing 3 in the broader sense, the connector 7 is placed on top of the housing 3 in a fluid-tight manner by means of a sealing ring 8. The connector 7 and the suction channel 6 have a common central longitudinal axis 9.

A more detailed look reveals that the connector 7 is substantially designed as a rotary body. The connector 7 comprises a contact face 10 facing downwards in which is disposed the sealing ring 8. The contact face 10 serves to establish a fluid-tight and surface-to-surface contact with a corresponding upper portion of the housing 3, said upper portion surrounding a flow opening 11 in the housing 3.

The contact face 10 is adjoined by an inner fixing portion 12 which is followed by a movement portion 13. The movement portion 13 is much longer than the fixing portion 12. The flow cross-section is substantially constant throughout the movement portion 13. The movement portion 13 is adjoined by a valve-seat portion 14 in which the circular flow cross-section reduces steadily so that the intermediate portion 15 adjoining the valve-seat portion 14 has a much smaller flow cross-section than the movement portion 13. The movement portion 13 extends into the valve-seat portion 14 via an annular shoulder 50. The intermediate portion 15 is then adjoined by an outer inlet portion 16 which has a smaller flow cross-section than the intermediate portion 15.

At the free end of the inlet portion 16, the connector 7 has a square end plate 17 which is disposed in a corresponding upper accommodation recess 18 of the cover 4. The end plate 17 is screwed to the housing 3 by means of four fastening screws 19.

The inlet portion 16, the intermediate portion 15, the valve-seat portion 14, the movement portion 13, the fixing portion 12 and the flow opening 11 together form the suction channel 6. The connector 7 is formed in one piece and is advantageously cast from a casting material.

In the suction channel 6 is disposed a valve unit for controlling the flow of fluid in the suction channel 6. The function of the valve unit, which is thus arranged on the suction side of the pump 1, is in particular to prevent a backflow of fluid from the working chamber 5 through the suction channel 6 when the pump 1 is no longer operated.

The valve unit comprises a guide body 21 which engages with the fixing portion 12 so as to be held in position. The valve unit further comprises a limiting element 22 which is guided for axial displacement in the guide body 21, a valve 23 which is guided for axial displacement through the guide body 21, and a pressure element 24 which is in contact with the guide body 21 and the limiting element 22. The valve unit has a central longitudinal axis 25 which is substantially in line with the central longitudinal axis 9 of the suction channel 6. The terms "axial" and "radial" used below refer to said central longitudinal axis 25. The limiting element 22 and the valve 23 are axially displaceable relative to each other along their common central longitudinal axis 25.

In its center, the guide body 21, which is formed in one piece and is preferably made of plastics, has an axially open guide bushing 26 which radially outwardly delimits an accommodation chamber 27 with a circular cross-section. In the guide bushing 26 are formed three axial guide grooves 28 which extend radially outwardly from the accommodation chamber 27. Arranged at equal distances from one another across the periphery of the inner wall 29 of the guide bushing 26, the guide grooves 28 extend across the entire axial height of the guide bushing 26 along the central longitudinal axis 25. A radially outer fixing ring 31 is connected to the guide bushing 26 via several carrier webs 30, the fixing ring 31 surrounding the guide bushing 26. Disposed at equal distances from one another, the carrier webs 30 extend radially outwardly from the guide bushing 26 to the fixing ring 31. Between the carrier webs 30 are in each case disposed flow openings 32 which are additionally delimited by the guide bushing 26 and the fixing ring 31. The height of the fixing ring 31 is lower than the height of the guide bushing 26. The height and the outer diameter of the fixing ring 31 are dimensioned such that the fixing ring 31 is able to at least partly engage with the fixing portion 12. Accommodated in the fixing portion 12, the fixing ring 31 ensures that the guide body 21 is held in a defined axial and radial position in the suction channel 6. The guide body 21 is further provided with snap-in bosses for axial fixing. A lower contact face 33 of the fixing ring 31 rests on spaced-apart contact projections 51 which are integral parts of the housing 3 and project radially in the direction of the center of the flow opening 11. The contact face 33 is aligned with the contact face 10 of the connector 7. Furthermore, a relative rotation between the guide body 21 and the housing 3 or the connector 7, respectively, is possible as well.

The limiting element 22 is also formed in one piece and is preferably made of plastics. The limiting element 22 comprises an upper carrier ring 34 which has a closed periphery and radially outwardly delimits an axially open accommodation opening 35. From the carrier ring 34, three support webs 36 project radially outwardly. The support webs 36 are disposed at equal distances to one another across the carrier ring 34. Moreover, three guide feet 37 extend axially downwardly from the carrier ring 34, wherein the guide feet 37 have a constant distance from each other across their length and are disposed at identical distances across the periphery of the carrier ring 34. Extending radially outwardly from the respective guide foot 37, a displacement stop 38 is in each case formed at the lower free end of the guide feet 37 and is provided with a stop face 39 facing upwardly. The guide feet 37 penetrate the accommodation chamber 27 and engage with the guide grooves 28 of the guide body 21 where they are guided for axial displacement. This engagement prevents a relative rotation between the guide body 21 and the limiting element 22. The displacement stops 38 are disposed below the guide body 21. At the bottom of the guide body 21 is formed a downwardly facing, annular stop face 40 which is able to interact with the upwardly facing stop faces 39 of the displacement stops 38 and forms part of the guide bushing 26. The carrier ring 34, on the other hand, is disposed above the guide body 21.

The aforementioned pressure element 24 is a helical compression spring. Said pressure element 24 rests on the one hand on the top of the guide body 21 and on the other hand against the underside of the support webs 36. The pressure element 24 is able to push the carrier ring 34 away from the axially fixed guide body 21 in the direction of the central longitudinal axis 25. The pressure element 24 surrounds the outside of the guide feet 37 and has a spring rate which is as low as possible. The pressure element 24 is non-detachably hooked between the guide body 21 and the limiting element 22.

Acting as a one-piece non-return valve, the valve 23 comprises an upper valve disk 41 and a valve stem 42 which extends axially downwardly away from said valve disk 41. The valve disk 41 has an umbrella-like design, extending radially outwardly from its center 43 in a downwardly inclined direction such that the highest point of the valve disk 41 is located in the center 43 thereof. The valve disk 41 has a radially outer, annular perimeter region 44 which is dimensioned such that the valve disk 41 is able to move along said perimeter region 44 in the movement portion 13. A sealing ring 45 is accommodated in the perimeter region 44 of the valve disk 41. When the valve 23 is in the sealing position, the sealing ring 45 sealingly cooperates with the valve seat portion 14 so as to achieve fluid-tight sealing of the suction channel 6 near the valve seat portion 14 by way of the valve disk 41. When the valve 23 is in the open position, on the other hand, the fluid is able to flow around the valve disk 41 in the movement portion 13.

The valve stem 42, which penetrates the accommodation opening 35 of the limiting element 22 and the accommodation chamber 27 of the guide body 21 while being axially displaceable therein, comprises three axial guide grooves 46 which are open to the outside and are disposed at equal distances from one another. The guide grooves 46 are in engagement with the guide feet 37 of the limiting element 22 so as to prevent a relative rotation between the valve stem 42 and the limiting element 22. Furthermore, several reinforcing webs 47 are formed at the underside of the valve disk 41 which extend radially outwardly from the guide stem 42 towards the perimeter region 44.

The following is a description of the function of the pump 1 and in particular of the valve unit. As already mentioned, the rotor disposed in the working chamber 5 can be set in rotation by way of the drive motor 2 so that a pumping effect or a compression effect, respectively, is achievable. In this process, the fluid to be delivered or compressed, respectively, is guided into the working chamber 5 in the inflow direction 20, i.e. via the suction channel 6. Seen in the inflow direction 20, the fluid passes the inlet portion 16, the intermediate portion 15, the valve-seat portion 14, the movement portion 13 and the fixing portion 12 as well as the flow opening 11. As already mentioned, the valve unit is disposed in the suction channel 6. The fluid is then moved around the working chamber 5 by way of the rotating rotary vanes of the rotor. In this delivery process, the fluid is trapped in each case between two adjacent rotary vanes and the housing 3, the rotary vanes and the housing 3 thus forming a pumping cell in which the fluid is compressed during the rotation.

The inflowing fluid applies a force, acting in the inflow direction 20, to the upper face of the valve disk 41 facing the fluid, causing the sealing ring 45 to be lifted off the valve-seat portion 14. The valve 23 is thus displaced downwardly relative to the valve-seat portion 14 into an open position shown in FIG. 5. The fluid is then able to flow steadily around the valve disk 41, strictly speaking along the radially outer perimeter region 44 of the valve disk 41, disposed in the movement portion 13. The fluid is then able to enter the working chamber 5 via the flow openings 32 formed in the guide body 21. When flowing towards the working chamber 5, the fluid also flows around the outside of the fixing ring 31. In the working chamber 5, the fluid is entrained by the rotor and afterwards discharged from the working chamber 5 via a pressure channel or a discharge channel, respectively. According to FIG. 1, the pump 1 is also equipped with an oil-removal device 48 on its pressure side through which the fluid passes. After cleaning, the fluid leaves the oil-removal device 48 via a discharge connector 49. The oil-removal device 48 is only used in connection with oil-lubricated pumps 1.

Figure 5:
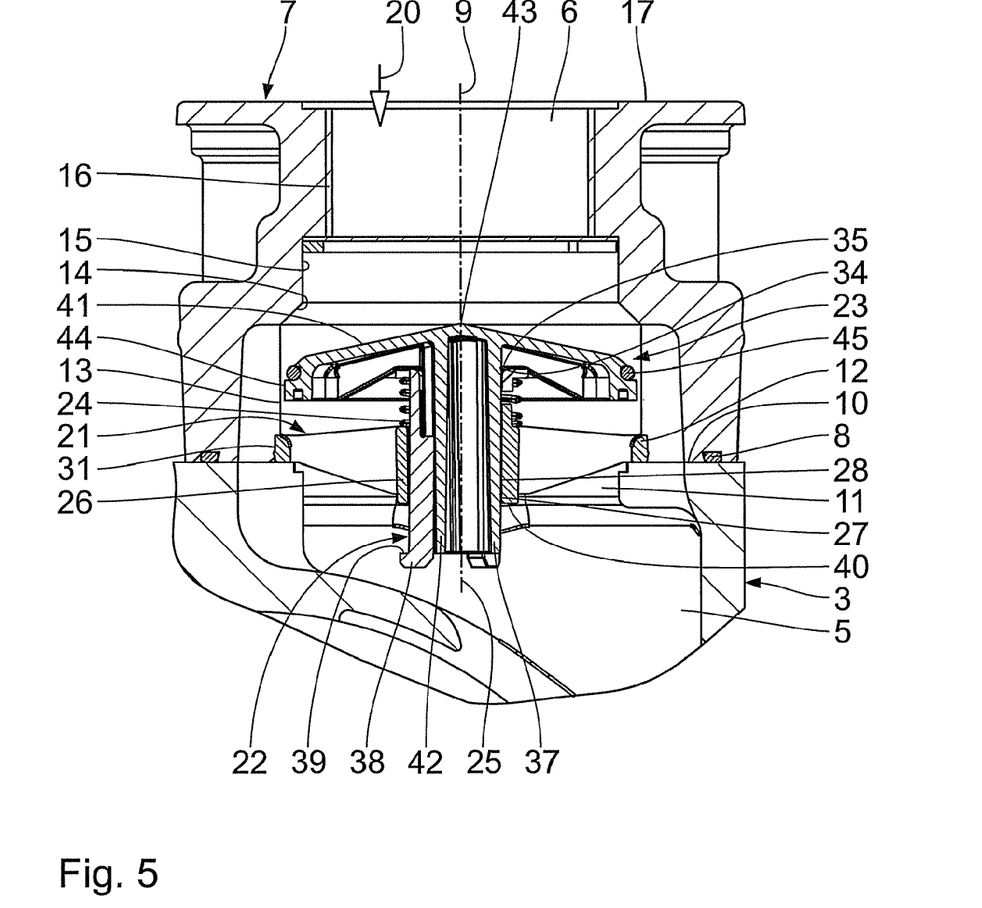
FIG. 5 shows an illustration similar to FIG. 4, wherein the valve is in an open position.

Also shown in FIG. 5, the stop face 39 of the limiting element 22 is lifted off the stop face 40 of the guide body 21 when the valve 23 is in the open position. The pressure element 24 is compressed, thus applying a force to the underside of the support webs 36 in a direction opposite to the inflow direction 20, with the result that the limiting element 22 is acted upon in the direction of the valve-seat portion 14 by way of the guide body 21. The guide body 21 forms an axial stop for the limiting element 22 when the valve 23 is in its maximum open position. Additionally, the limiting element 22 also forms an axial stop for the valve 23 when in the maximum open position.

When the flow speed of the inflowing fluid or the force acting on the valve disk 41, respectively, reduces, the valve 23 is moved along the movement portion 13 towards the valve-seat portion 14 along the central longitudinal axis 25 opposite to the inflow direction 20 by way of the limiting 22 which is moved likewise. The force required therefor is applied to the limiting element 22 by way of the pressure element 24 via the support webs 36. As the valve disk 41 of the valve 23 rests on top of the support webs 36, this also causes the valve 23 to be moved towards valve-seat portion 14. The valve 23 does not reach its sealing position, however; it is situated in the movement portion 13 in an open position at an axial distance from said sealing position. The stop faces 39 of the displacement stops 38 are in surface-to-surface contact with the stop face 40 of the guide body 21. The displacement stops 38 or their stop faces 39, respectively, are however arranged such that in such a flow situation, the valve disk 41 or the sealing ring 45 thereof, respectively, resting on top of the support webs 36 remains axially spaced from the valve-seat portion 14 while the limiting element 22 defines the maximum length or extension, respectively, of the pressure element 24. Consequently, the limiting element 22 limits the maximal axial extension of the pressure element 24 towards the sealing position of the valve 23, the valve 23 and/or the valve disk 41 being free to move further along the central longitudinal axis 25 towards its sealing position. Owing to its own weight, the disk 41 rests on top of the support webs 36. The ultimate vacuum of the pump 1 is thus reliably achievable as the spring pretension of the pressure element 24 is completely absorbed by the limiting element 22.

When the drive motor 2 is switched off so that the pump 1 is no longer operated, the valve disk 41 is pressed against the valve seat portion 14 by way of the returning fluid and the pressure difference in the suction channel 6. The sealing ring 45 is then in a sealing contact with the valve-seat portion 14, thus preventing a backflow of fluid through the valve disk 41 via the suction channel 6. The valve disk 41 is lifted off the support webs 36 to an axially spaced position. In contrast to the position described above, the valve disk 41 has been moved along the central longitudinal axis 25 opposite to the inflow direction 20 by way of the limiting element 22. The sealing position of the valve 23 can only be reached if the valve disk 41 is lifted off the support webs 36 to an axially spaced position. There is a relative axial displacement between the limiting element 22 and the valve 23 when the valve disk 41 is lifted off the support webs 36 to reach its sealing position. The valve 23 is not provided with a stop for limiting said axial sealing movement. In the sealing position, the sealing ring 45 is in fluid-tight contact with the valve-seat portion 14 such that the suction channel 6 is completely sealed. The pressure element 24 has no influence on the attainable ultimate vacuum of the pump 1. Here, the stop faces 39 of the displacement stops 38 are in surface-to-surface contact with the stop face 40 of the guide body 21 as well.

When the pump is operated again, the valve disk 41 is—in reverse order—axially moved away from the valve-seat portion 14 in the flow direction 20 so as to re-open the suction channel 6. There is a relative axial displacement between the limiting element 22 and the valve 23 when the valve disk 41 leaves its sealing position and approaches the support webs 36.

The pressure element 24 may also be formed by other resilient elements, such as a ring made of an elastomer material.

In the above described embodiment, the valve unit comprises three guide feet 37 which are guided for displacement in the three guide grooves 28. Furthermore, the limiting element 22 comprises three support webs 36 for supporting the valve disk 41. Alternatively, other numbers of the mentioned components are conceivable as well. The valve unit may for instance in each case comprise two or more than three of the mentioned components.

What is claimed is:
1. A pump comprising
a) a housing;
b) a working chamber located in the housing for delivery of a fluid;
c) a suction channel which is in flow connection with the working chamber for guiding the fluid into the working chamber;
d) a valve unit disposed in the suction channel, the valve unit comprising i) a guide body;

ii) a valve which is movable between an open position and a sealing position for controlling the flow of the fluid in the suction channel, the valve being guided for displacement; and wherein the valve comprises a valve disk and a valve stem connected thereto;

iii) a limiting element which is guided for displacement in the guide body and comprises at least one displacement stop for limitation of displacement; wherein the displacement stop arranged such that in the sealing position of the valve, the valve disk is lifted off the limiting element; and iv) a pressure element which presses the limiting element in a direction towards the sealing position of the valve; and e) a pressure channel which is in flow connection with the working chamber for guiding the fluid out of the working chamber.

2. A pump according to claim 1, wherein the guide body is stationarily mounted in the housing.

3. A pump according to claim 1, wherein the limiting element comprises at least one support web for cooperation with the pressure element.

4. A pump according to claim 1, wherein the pressure element is supported relative to the guide body.

5. A pump according to claim 1, wherein in the housing is formed a valve-seat portion which is in contact with the valve disk when the valve is in the sealing position.

6. A pump according to claim 1, wherein the limiting element and the valve have a common central longitudinal axis along which they are displaceable.

7. A pump according to claim 1, wherein the limiting element and the valve are displaceable relative to each other along their common central longitudinal axis.

8. A pump according to claim 1, wherein the guide body and the limiting element are in engagement with one another so as to prevent a relative rotation with respect to each other.

9. A pump according to claim 1, wherein the valve is guided for displacement through the guide body.

10. A pump according to claim 1, wherein the limiting element and the valve are in engagement with one another so as to prevent a relative rotation with respect to each other.

11. A pump according to claim 1, wherein the limiting element has an axial stop for the valve.

12. A pump according to claim 1, wherein the limiting element defines the maximum axial extension of the pressure element.

13. A valve unit for a pump, the valve unit comprising a) a guide body;

b) a limiting element which is guided for displacement in the guide body and comprises at least one displacement stop for limitation of displacement;

c) a valve, said valve includes a valve disk and a valve stem connected thereto, which is movable between an open position and a sealing position for controlling the flow of the fluid in a suction channel, the valve being guided for displacement, wherein said stop is arranged such that in the sealing position of the valve, the valve disk is lifted off the limiting element; and d) a pressure element which presses the limiting element in the direction of the sealing position of the valve.

* * * * *